United States Patent
Zhang et al.

(10) Patent No.: US 11,011,925 B2
(45) Date of Patent: May 18, 2021

(54) BATTERY CHARGING APPARATUS AND METHOD, TERMINAL, POWER ADAPTER, AND STORAGE MEDIUM

(71) Applicant: Huawei Technologies Co., Ltd., Shenzhen (CN)

(72) Inventors: Chao Zhang, Shenzhen (CN); Chong Wen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 16/304,067

(22) PCT Filed: Apr. 28, 2017

(86) PCT No.: PCT/CN2017/082577
§ 371 (c)(1),
(2) Date: Nov. 21, 2018

(87) PCT Pub. No.: WO2017/202179
PCT Pub. Date: Nov. 30, 2017

(65) Prior Publication Data
US 2019/0319478 A1    Oct. 17, 2019

(30) Foreign Application Priority Data
May 23, 2016 (CN) .......................... 201610349099.5

(51) Int. Cl.
*H02J 7/00* (2006.01)
*H01M 10/44* (2006.01)
*H02J 7/02* (2016.01)

(52) U.S. Cl.
CPC ..... *H02J 7/007192* (2020.01); *H01M 10/443* (2013.01); *H02J 7/027* (2013.01)

(58) Field of Classification Search
USPC ......................................................... 320/150
See application file for complete search history.

(56) References Cited

U.S. PATENT DOCUMENTS 5,504,413 A * 4/1996 Fernandez ............ H02J 7/0068
                                                               320/163
8,907,631 B1   12/2014 Gurries et al.
(Continued)

FOREIGN PATENT DOCUMENTS

CN           2569461 Y      8/2003
CN         101741119 A      6/2010
(Continued)

OTHER PUBLICATIONS

Machine Translation and Abstract of Chinese Publication No. CN2569461, Aug. 27, 2003, 9 pages.
(Continued)

*Primary Examiner* — Samuel Berhanu
(74) *Attorney, Agent, or Firm* — Conley Rose, P.C.

(57) ABSTRACT

A battery charging apparatus and method, a terminal, a power adapter, and a storage medium relate to the electronics field, where the method includes detecting temperature of a charging path in a battery charging apparatus, and when a power adapter supplying charging power for the battery charging apparatus works in a first working mode and a detected largest temperature value is greater than or equal to a preset threshold, instructing the power adapter to switch to a second working mode, decoupling a charging path corresponding to the first working mode, and coupling a charging path corresponding to the second working mode. This reduces impact of local heat accumulation on device performance during charging of a terminal battery, lengthens a device life span, and improves user experience.

14 Claims, 7 Drawing Sheets

(56) References Cited

U.S. PATENT DOCUMENTS

| | | | |
|---|---|---|---|
| 10,707,690 B2* | 7/2020 | Jung | ........................ H02J 7/042 |
| 2010/0127666 A1 | 5/2010 | Ball | |
| 2011/0133701 A1 | 6/2011 | Li et al. | |
| 2012/0112705 A1* | 5/2012 | Wang | ........................ H02J 7/00 |
| | | | 320/152 |
| 2015/0069951 A1 | 3/2015 | Wang et al. | |
| 2015/0137741 A1 | 5/2015 | Gurries et al. | |
| 2015/0357851 A1* | 12/2015 | Huang | .................. H02M 3/158 |
| | | | 320/108 |
| 2017/0358945 A1 | 12/2017 | Zhang et al. | |
| 2018/0115179 A1* | 4/2018 | Fan | ........................ H02J 50/10 |
| 2018/0175659 A1 | 6/2018 | Zhang et al. | |
| 2020/0036218 A1* | 1/2020 | Maalouf | .................. H02J 50/40 |

FOREIGN PATENT DOCUMENTS

| | | |
|---|---|---|
| CN | 201690242 U | 12/2010 |
| CN | 102412610 A | 4/2012 |
| CN | 103413985 A | 11/2013 |
| CN | 103779907 A | 5/2014 |
| CN | 104348222 A | 2/2015 |
| JP | H04178123 A | 6/1992 |
| JP | H07308031 A | 11/1995 |
| JP | H11259187 A | 9/1999 |
| JP | 2002218026 A | 8/2002 |
| JP | 2008005645 A | 1/2008 |
| JP | 2015035886 A | 2/2015 |
| WO | 2015113334 A1 | 8/2015 |

OTHER PUBLICATIONS

Machine Translation and Abstract of Chinese Publication No. CN102412610, Apr. 11, 2012, 11 pages.

Machine Translation and Abstract of Chinese Publication No. CN103413985, Nov. 27, 2013, 7 pages.

Foreign Communication From a Counterpart Application, PCT Application No. PCT/CN2017/082577, English Translation of International Search Report dated Jul. 27, 2017, 2 pages.

Foreign Communication From a Counterpart Application, PCT Application No. PCT/CN2017/082577, English Translation of Written Opinion dated Jul. 27, 2017, 4 pages.

Foreign Communication From a Counterpart Application, Chinese Application No. 201610349099.5, Chinese Office Action dated Dec. 12, 2019, 8 pages.

* cited by examiner

BATTERY CHARGING APPARATUS AND METHOD, TERMINAL, POWER ADAPTER, AND STORAGE MEDIUM

CROSS-REFERENCE TO RELATED APPLICATIONS

This application is a U.S. National Stage of International Patent Application No. PCT/CN2017/082577 filed on Apr. 28, 2017, which claims priority to Chinese Patent Application No. 201610349099.5 filed on May 23, 2016. Both of the aforementioned applications are hereby incorporated by reference in their entireties.

TECHNICAL FIELD

The present invention relates to the electronics field, and in particular, to a battery charging apparatus and method, a terminal, a power adapter, and a storage medium.

BACKGROUND

As technologies develop, terminals have become devices necessary in daily life. Users are increasingly concerned about a charging time of a terminal battery.

To shorten a charging time, a plurality of fast charging solutions are proposed. One is a high-voltage charging solution. This solution is implemented by increasing a transmission line voltage and decreasing the voltage at a front end of a battery before injection into the battery. Another solution is a high-current charging solution. This solution is implemented by increasing a charging current.

However, the high-voltage charging solution is affected by conversion efficiency of a switch voltage reduction chip at the front end of the battery, because heat accumulates locally at the switch voltage reduction chip, increasing device temperature. The high-current charging solution is affected by impedance of an entire charging path, because heat accumulates in a part with relatively high impedance (for example, a connector), making temperature of a terminal rise constantly.

Therefore, whichever of the foregoing fast charging solutions is used to charge a terminal battery, a problem of local heat accumulation is inevitably caused. When heat dissipation is inadequate, continuous local heat accumulation affects device performance and shortens a device life span. This weakens use experience of a user.

SUMMARY

Embodiments of the present invention provide a charging apparatus and method, a terminal, a power adapter, and a storage medium, to reduce impact of local heat accumulation on device performance during charging of a terminal battery, lengthen a device life span, and improve user experience.

To achieve the foregoing objectives, the embodiments of the present invention adopt the following technical solutions:

According to a first aspect of the present invention, a battery charging apparatus is provided. The apparatus is electrically connected to a battery in a terminal, and includes a charging control unit, a charging unit, and a temperature collector.

When the battery charging apparatus works, the temperature collector detects temperature of a charging path in the charging unit, and transfers the detected temperature to the charging control unit. The charging unit includes at least two charging paths that are connected in parallel. The charging unit connects, according to an instruction of the charging control unit, a charging path corresponding to a working mode of a power adapter. The charging control unit is electrically connected to the temperature collector, the charging unit, and the power adapter that supplies charging power for the battery charging apparatus. The charging control unit indicates a working state of the charging unit and a working state of the power adapter according to the temperature transferred by the temperature collector. When the power adapter works in a first working mode and a largest temperature value transferred by the temperature collector is greater than or equal to a preset threshold, the charging control unit instructs the power adapter to switch to a second working mode, and instructs the charging unit to disconnect a charging path corresponding to the first working mode and connect a charging path corresponding to the second working mode.

In this way, when charging the terminal battery, the battery charging apparatus detects current temperature of the charging path in real time. When the detected largest temperature value is greater than or equal to the preset threshold, switching between the working modes of the power adapter is performed, and the charging path corresponding to the working mode of the power adapter is connected, to charge the terminal battery. Different charging paths have different heat accumulation locations. Therefore, in a charging process, switching to a different charging path according to detected temperature can disperse heat accumulation. This avoids continuous local heat accumulation at a fixed location. When heat dissipation is inadequate, heat is evenly distributed in a device, so as to prevent device performance from being affected by heat accumulation during charging, and increase a device life span. Therefore, use experience of a user is improved.

With reference to the first aspect, in a possible implementation, the battery charging apparatus includes a temperature collector deployed for each charging path in the charging unit, to detect temperature of each charging path in the charging unit.

In this way, one temperature collector detects temperature of one charging path, so that temperature of the charging path in the charging unit is precisely detected. This brings high precision of detection, and thereby makes the battery charging apparatus better achieve the beneficial effects of the foregoing first aspect.

With reference to the first aspect or the foregoing possible implementation, in another possible implementation, the largest temperature value is temperature of the charging path corresponding to the first working mode of the power adapter.

Because the power adapter works in the first working mode, the charging path corresponding to the first working mode in the charging unit is in a connected state. Therefore, the temperature of the charging path is the highest.

It can be learned that the preset threshold is a preset acceptable upper temperature limit of local heat accumulation. When the detected largest temperature value is greater than or equal to the preset threshold, it indicates that heat accumulation in the currently connected charging path reaches the upper limit during charging, and heating at this location needs to be stopped. In this case, switching to another charging path is performed, to disperse heat accumulation.

In this way, when determining that the temperature of the charging path corresponding to the working mode in which the power adapter works is greater than or equal to the preset threshold, the charging control unit instructs the power adapter to switch to the second working mode, and instructs the charging unit to disconnect the charging path corresponding to the first working mode and connect the charging path corresponding to the second working mode, so that a control process of the charging control unit better meets an actual circuit requirement. Therefore, a user requirement is better met, and the beneficial effects of the first aspect are better achieved.

With reference to any one of the first aspect or the foregoing possible implementations, in another possible implementation, when the largest temperature value transferred by the temperature collector and received by the charging control unit is greater than or equal to the preset threshold, a heating location of the charging path corresponding to the second working mode to which the charging control unit instructs the power adapter to switch is farthest from a heating location of the charging path corresponding to the first working mode; or the charging path corresponding to the second working mode to which the charging control unit instructs the power adapter to switch is a charging path with a smallest theoretical quantity of heat generated in the charging unit, other than the charging path corresponding to the first working mode.

The charging path corresponding to the switched-to second working mode is used to disperse heat accumulation in the charging path corresponding to the first working mode during charging. Therefore, switching to the charging path whose heating location is farthest from the heating location of the charging path corresponding to the first working mode or switching to the charging path with the smallest theoretical quantity of heat generated other than the charging path corresponding to the first working mode can most efficiently disperse heat accumulation, during charging, in the charging path corresponding to the first working mode. Therefore, heat accumulation in the charging path corresponding to the first working mode during charging can be quickly dispersed. This further improves device performance and the device life span.

With reference to any one of the first aspect or the foregoing possible implementations, in another possible implementation, charging power for the battery charging apparatus is supplied by an external power adapter, and the battery charging apparatus is electrically connected to the power adapter. The charging control unit may first obtain a working mode supported by the power adapter. If determining that the power adapter supports at least two working modes and determining that charging paths corresponding to the at least two working modes supported by the power adapter exist in the charging unit, the charging control unit performs the indicating a working state of the charging unit and a working state of the power adapter according to the temperature transferred by the temperature collector.

In this way, whether the solution in the present invention can be used for the power adapter and the battery charging apparatus is determined first, and then the method in the present invention is performed. This avoids failure of normal charging caused by working state switching performed on the power adapter and the charging unit when the power adapter does not match the battery charging apparatus. Therefore, reliability of the charging process is ensured, and user experience is improved.

With reference to any one of the first aspect or the foregoing possible implementations, in another possible implementation, the charging control unit is further configured to: in an initial charging state of the battery charging apparatus, instruct the power adapter to work in a third working mode, and instruct the charging unit to connect a charging path corresponding to the third working mode, where the third working mode is any one of working modes supported by the power adapter, and the charging path corresponding to the third working mode exists in the charging unit.

Specifically, when the battery charging apparatus detects that an external power adapter is connected, or when the battery charging apparatus detects that AC power is input, the battery charging apparatus instructs the power adapter to work in a working mode corresponding to the initial charging state, and instructs the charging unit to connect a charging path corresponding to the working mode. In this way, in the initial charging state upon power-on, the battery charging apparatus can easily and quickly start working.

With reference to any one of the first aspect or the foregoing possible implementations, in another possible implementation, the third working mode is a working mode, of the power adapter, corresponding to a charging path with a smallest theoretical quantity of heat generated in the charging unit, or the third working mode is an initial working mode that is preset in the power adapter, or the third working mode is a working mode that is used before the power adapter is powered off last time.

In this way, presetting different specific content of the third working mode can achieve different beneficial effects. This may specifically include the following:

If the third working mode is the working mode, of the power adapter, corresponding to the charging path with the smallest theoretical quantity of heat generated in the charging unit, that is, in the initial charging state, the battery charging apparatus chooses to connect the charging path with the smallest quantity of heat generated, a quantity of heat generated in the battery charging apparatus is made the smallest, and reliability of the battery charging apparatus is improved.

If the third working mode is the initial working mode that is preset in the power adapter or the third working mode is the working mode that is used before the power adapter is powered off last time, in the initial charging state upon power-on, the battery charging apparatus can easily and quickly start working.

With reference to any one of the first aspect or the foregoing possible implementations, in another possible implementation, charging power for the battery charging apparatus is supplied by an external power adapter, and the battery charging apparatus is electrically connected to the power adapter. The battery charging apparatus further includes a communications port, used for electrical connection between the battery charging apparatus and the power adapter. An input end of the charging unit is connected to the communications port, to receive the charging power supplied by the power adapter. A control end of the charging control unit is connected to the communications port, to indicate the working state of the power adapter.

With reference to any one of the first aspect or the foregoing possible implementations, in another possible implementation, the battery charging apparatus includes a power adapter, and the battery charging apparatus further includes a battery port, used for electrical connection to the external terminal battery. An output end of the charging unit is connected to the battery port, to connect to an electrode of the terminal battery by using the battery port. That is, when the electrode of the terminal battery is connected to the battery port, electrical connection between the charging unit and the terminal battery is implemented.

According to a second aspect of the present invention, a power adapter is provided. The power adapter is electrically connected to the battery charging apparatus in any one of the first aspect or the possible implementations of the first aspect, and supplies charging power for the battery charging apparatus. The power adapter supports at least two working modes. The power adapter includes a communications interface, a switching switch, a communications mode, and a power module. The communications module communicates with the battery charging apparatus by using the communications interface, to receive instruction information that is sent by the battery charging apparatus and that is used to indicate a working mode of the power adapter. The power module supplies charging power for the battery charging apparatus by using the communications interface. The switching switch controls a working mode of the power module. The communications module further performs switching between working states of the switching switch according to the received instruction information sent by the battery charging apparatus, to control the working mode of the power module.

The power adapter provided in the present invention supplies charging power for the battery charging apparatus through electrical connection to the battery charging apparatus, and switches between working states according to an instruction of the battery charging apparatus, to cooperate with the battery charging apparatus in switching between the working states of the power adapter according to detected charging path temperature. In a charging process, cooperating with the battery charging apparatus in switching to a different charging path according to detected temperature can disperse heat accumulation. This avoids continuous local heat accumulation at a fixed location. When heat dissipation is inadequate, heat is evenly distributed in a device, so as to prevent device performance from being affected by heat accumulation during charging, and increase a device life span. Therefore, use experience of a user is improved.

According to a third aspect, a battery charging method is provided, applied to the battery charging apparatus provided in any one of the first aspect or the possible implementations of the first aspect, where the battery charging apparatus includes at least two charging paths that are connected in parallel, and is configured to charge a terminal battery, and the method includes:

detecting temperature of a charging path in the battery charging apparatus; and when a power adapter supplying charging power for the battery charging apparatus works in a first working mode and a detected largest temperature value is greater than or equal to a preset threshold, instructing the power adapter to switch to a second working mode, disconnecting a charging path corresponding to the first working mode, and connecting a charging path corresponding to the second working mode.

In this way, when charging the terminal battery, the battery charging apparatus detects current temperature of the charging path in real time. When the detected largest temperature value is greater than or equal to the preset threshold, switching between the working modes of the power adapter is performed, and the charging path corresponding to the working mode of the power adapter is connected, to charge the terminal battery. Different charging paths have different heat accumulation locations. Therefore, in a charging process, switching to a different charging path according to detected temperature can disperse heat accumulation. This avoids continuous local heat accumulation at a fixed location. When heat dissipation is inadequate, heat is evenly distributed in a device, so as to prevent device performance from being affected by heat accumulation during charging, and increase a device life span. Therefore, use experience of a user is improved.

From the foregoing, it can be learned that the battery charging method provided in the third aspect is executed by the battery charging apparatus provided in the first aspect and therefore can achieve the same beneficial effects as any one of the first aspect or the possible implementations of the first aspect. Details are not described herein again.

According to a fourth aspect, a terminal is provided, including the battery charging apparatus and the battery in any one of the first aspect or the possible implementations of the first aspect.

The terminal provided in the fourth aspect of the present invention includes the battery charging apparatus in any one of the first aspect or the possible implementations of the first aspect. Therefore, the battery of the terminal can be charged by the battery charging apparatus in any one of the first aspect or the possible implementations of the first aspect, so as to achieve the same beneficial effects as any one of the first aspect or the possible implementations of the first aspect. Details are not described herein again.

According to a fifth aspect of the present invention, a non-volatile computer readable storage medium that stores one or more programs is provided, where the one or more programs include an instruction, and when executed by the battery charging apparatus in any one of the first aspect or the possible implementations of the first aspect that includes a charging control unit, a charging unit, and a temperature collector, the instruction causes the battery charging apparatus to perform the following events:

detecting, by the temperature collector, temperature of a charging path in the charging unit, and transferring the detected temperature to the charging control unit; connecting, by the charging unit according to an instruction of the charging control unit, a charging path corresponding to a working mode of a power adapter, where the charging unit includes at least two charging paths that are connected in parallel; indicating, by the charging control unit, a working state of the charging unit and a working state of the power adapter according to the temperature transferred by the temperature collector; and when the power adapter works in a first working mode and a largest temperature value transferred by the temperature collector is greater than or equal to a preset threshold, instructing, by the charging control unit, the power adapter to switch to a second working mode, and instructing the charging unit to disconnect a charging path corresponding to the first working mode and connect a charging path corresponding to the second working mode.

The non-volatile computer readable storage medium that stores one or more programs and that is provided in the fifth aspect of the present invention can implement functions of the battery charging apparatus in any one of the first aspect or the possible implementations of the first aspect when the battery charging apparatus in any one of the first aspect or the possible implementations of the first aspect executes the program instruction stored in the readable storage medium, so as to achieve the same beneficial effects as any one of the first aspect or the possible implementations of the first aspect. Details are not described herein again.

DESCRIPTION OF EMBODIMENTS

The following clearly and completely describes the technical solutions in the embodiments of the present invention with reference to the accompanying drawings in the embodiments of the present invention. Apparently, the described embodiments are merely some rather than all of embodiments of the present invention. All other embodiments obtained by a person of ordinary skill in the art based on the embodiments of the present invention without creative efforts shall fall within the protection scope of the present invention.

Based on this, a basic principle of the present invention is as follows: Two or more charging paths connected in parallel are deployed in a battery charging apparatus, and the charging paths are corresponding to different working modes of a power adapter. When a battery is charged by using the power adapter, temperature of a charging path is detected. When a detected largest temperature value is greater than or equal to a preset threshold, the power adapter is instructed to switch to another working mode, and a charging path corresponding to the working mode of the power adapter is connected, to disperse heat accumulation in a previously used charging path. This avoids poor device performance and a short device life span that are caused by continuous heat accumulation at one location in a device, and well improves use experience of a user.

Figure 1:
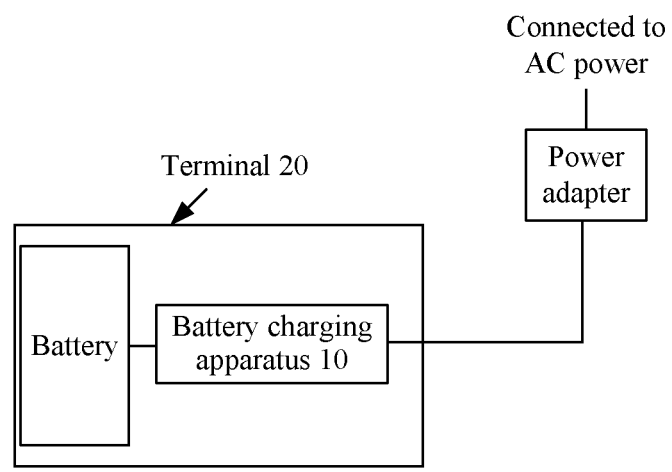
FIG. 1 is a schematic diagram of an application scenario of a battery charging apparatus according to an embodiment of the present invention.

FIG. 1 shows an application scenario of a battery charging apparatus 10 according to an embodiment of the present invention. In this scenario, the battery charging apparatus 10 provided in this embodiment of the present invention is included in a terminal 20, and charging power for the battery charging apparatus 10 is supplied by an external power adapter, so that the battery charging apparatus 10 charges a battery of the terminal 20.

Figure 2:
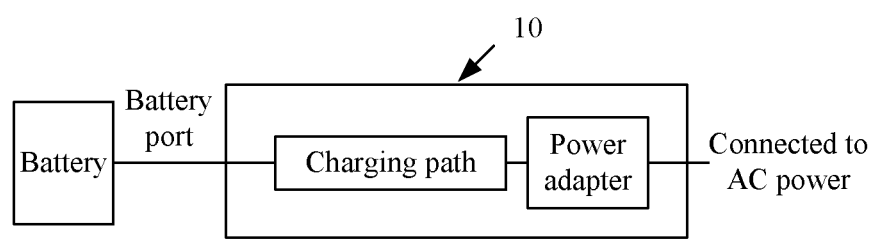
FIG. 2 is a schematic diagram of an application scenario of another battery charging apparatus according to an embodiment of the present invention.

FIG. 2 shows another application scenario of a battery charging apparatus 10 according to an embodiment of the present invention. In this scenario, the battery charging apparatus 10 provided in this embodiment of the present invention is a seat-type charger configured to charge an independent battery. The battery charging apparatus 10 includes a power adapter, and AC power is directly input into the battery charging apparatus 10. The battery charging apparatus 10 is connected to only a battery of a terminal 20, to charge the battery.

It should be understood that, in the embodiments of the present invention, a terminal may be referred to as user equipment (User Equipment, UE), a mobile station (Mobile Station, MS), a mobile terminal (Mobile Terminal), a computer, a microcomputer, or the like. The terminal may communicate with one or more core networks by using a radio access network (Radio Access Network, RAN). For example, the terminal may be a mobile phone (also referred to as a "cellular" phone) or a computer provided with a mobile terminal. For example, the terminal may alternatively be a portable mobile apparatus, a pocket-sized mobile apparatus, a handheld mobile apparatus, a computer built-in mobile apparatus, or an in-vehicle mobile apparatus, where the mobile apparatus exchanges voice and/or data with the radio access network. This is not limited in the present invention. For example, the terminal also includes a terminal with a multi-carrier feature and wireline access.

Figure 3:
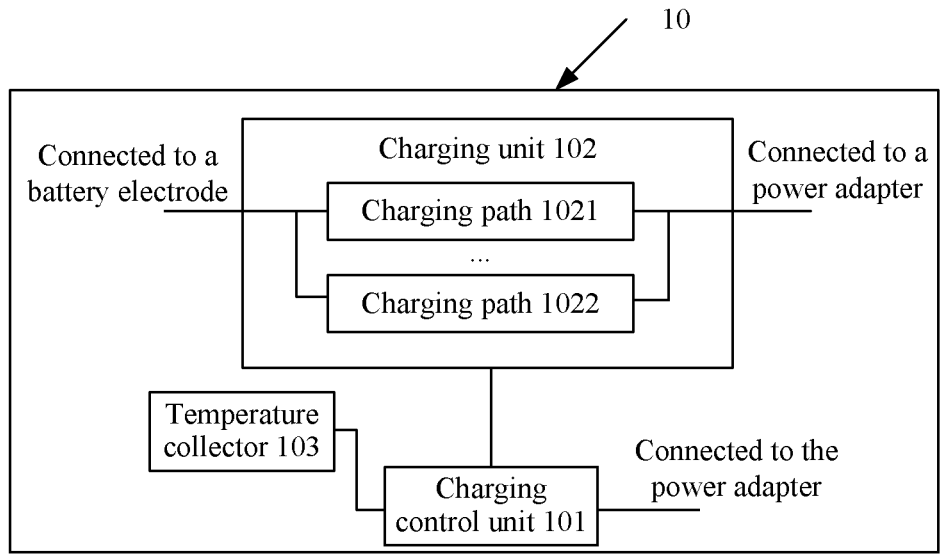
FIG. 3 is a schematic structural diagram of a battery charging apparatus according to an embodiment of the present invention.

FIG. 3 is a schematic structural diagram of a battery charging apparatus 10 according to an embodiment of the present invention. The battery charging apparatus 10 is electrically connected to a battery in a terminal, and the battery charging apparatus 10 may include at least a charging control unit 101, a charging unit 102, and a temperature collector 103. The charging unit 102 includes at least two charging paths. The at least two charging paths are connected in parallel. The charging unit 102 is electrically connected to a power adapter 102. The charging control unit 101 is electrically connected to the temperature collector 103, the charging unit 102, and the power adapter 104.

It should be noted that, for the at least two charging paths included in the charging unit 102, the accompanying drawings in the embodiments of the present invention show a charging path 1021 and a charging path 1022 for example. However, this does not limit a quantity of charging paths in the charging unit 102.

Figure 3A:
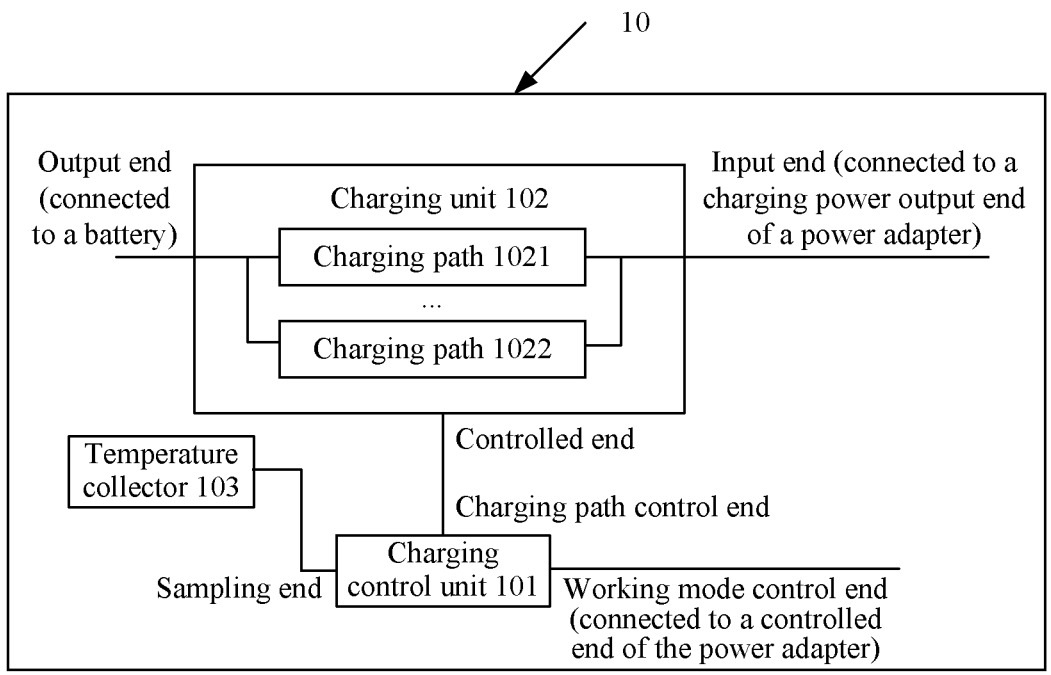
FIG. 3a is a schematic structural diagram of another battery charging apparatus according to an embodiment of the present invention.

Specifically, as shown in FIG. 3a, a controlled end of the charging unit 102 is connected to a charging path control end of the charging control unit 101. An input end of the charging unit 102 is connected to a charging power output end of the power adapter 104. An output end of the charging unit 102 is connected to the terminal battery 201. The temperature collector 103 is connected to a sampling end of the charging control unit 101. A working mode control end of the charging control unit 101 is connected to a controlled end of the power adapter 104. The power adapter 104 supplies charging power for the battery charging apparatus 10.

The following specifically describes each constituent part of the battery charging apparatus 10 with reference to FIG. 3.

The temperature collector 103 is configured to detect temperature of a charging path in the charging unit 102, and transfer the detected temperature to the charging control unit 101.

Specifically, the temperature collector 103 may be a temperature sensor, may be a thermistor (negative temperature coefficient (Negative Temperature Coefficient, NTC) or positive temperature coefficient (Positive Temperature Coefficient, PTC)), or may be a thermocouple, a bridge, or another device that can detect temperature. A specific type of the temperature collector 103 is not limited in this embodiment of the present invention.

Optionally, the temperature collector 103 may transfer a detected actual temperature value, may transfer a value obtained by performing analog-to-digital conversion (Analog-to-digital converter, ADC) on a detected actual temperature value, or may transfer another value. A specific form and content of the temperature transferred by the temperature collector 103 is not limited in this embodiment of the present invention.

Optionally, the battery charging apparatus 10 may include only one temperature collector 103.

Optionally, the battery charging apparatus 10 may include a temperature collector 103 deployed for each charging path in the charging unit 102, to separately detect temperature of each charging path in the charging unit 102. That is, a quantity of temperature collectors 103 is the same as a quantity of the charging paths. It should be noted that FIG. 3 shows only one temperature collector 103 for example. This does not limit a quantity of temperature collectors 103 in the battery charging apparatus 10.

Further, when the battery charging apparatus 10 includes a temperature collector 103 deployed for each charging path in the charging unit 102, the temperature collector 103 may be deployed beside a component whose temperature is the highest in the charging path monitored by the temperature collector 103.

It should be noted that, in actual application, a specific location of the temperature collector in the battery charging apparatus 10 may be set according to an actual requirement. A location of the temperature collector 103 is not specifically limited in this embodiment of the present invention.

The charging unit 102 connects, according to an instruction of the charging control unit 101, a charging path corresponding to a working mode of the power adapter 104, to charge the terminal battery.

The charging path may be a conventional general charging path. Alternatively, the charging path may be a high-voltage charging path and include, from an input end to an output end, a protective circuit and a voltage step-down circuit that are connected in sequence. Alternatively, the charging path may be a high-current charging path and include a switch circuit. Certainly, the charging path may alternatively be another charging path. A specific type of the charging path is not specifically limited in this embodiment of the present invention.

Specifically, for each working mode of the power adapter 104, there is a corresponding preset charging path in the charging unit 102 of the battery charging apparatus 10. Content of a preset correspondence is not specifically limited in the present invention and may be set according to an actual requirement.

For example, a high-current charging working mode is a charging mode in which a high current is output, and therefore is corresponding to a high-current charging path. A high-voltage working mode is a charging mode in which a high voltage is output, and therefore is corresponding to a high-voltage charging path.

The high-current charging mode or the high-voltage charging mode is relative to the conventional general charging mode. A charging mode in which an output current is higher than that in the conventional general charging mode is referred to as the high-current charging mode. A charging mode in which an output voltage is higher than that in the conventional general charging mode is referred to as the high-voltage charging mode.

For example, it is assumed that, in the conventional general charging mode, an output voltage is 5 volts and an output current is 0.7 amperes. In this case, a charging mode in which an output voltage is 5 volts and an output current is 2 amperes is the high-current charging mode, and a charging mode in which an output voltage is 7 volts and an output current is 0.7 amperes is the high-voltage charging mode.

Optionally, a correspondence between a working mode of the power adapter 104 and a charging path in the charging unit 102 may be stored in the charging control unit 101.

The charging control unit 101 indicates a working state of the charging unit 102 and a working state of the power adapter 104 according to the temperature transferred by the temperature collector 103. Specifically, when the power adapter 104 works in a first working mode and a largest temperature value transferred by the temperature collector 103 is greater than or equal to a preset threshold, the charging control unit 101 instructs the power adapter 104 to switch to a second working mode, and instructs the charging unit 102 to disconnect a charging path corresponding to the first working mode and connect a charging path corresponding to the second working mode.

Specifically, the charging control unit 101 may send working mode switching instruction information to the power adapter 104. The working mode switching instruction information includes an identifier of the second working mode, and is used to instruct the power adapter 104 to switch from the current first working mode to the second working mode indicated by the working mode identifier included in the switching instruction information. When receiving the working mode switching instruction information, the power adapter 104 may switch to the second working mode according to an instruction of the working mode switching instruction information.

Specifically, the charging control unit 101 controls the charging unit 102 to disconnect the currently connected charging path corresponding to the first working mode and connect the charging path corresponding to the second working mode.

Optionally, for the charging control unit 101 to control the charging unit 102 to disconnect or connect a charging path, a switch component may be deployed in the charging unit 102. The switch component is connected to all the charging paths, and can control connection or disconnection of the charging paths separately. The switch component works in a connected or disconnected state according to an instruction of the charging control unit 101, to control connection or disconnection of the charging paths.

In this embodiment of the present invention, connection may be understood as connection, conduction, or electrical connection.

For example, the charging control unit 101 controls connection or disconnection of the charging paths by using a single-pole double-throw switch having a control end. When the charging unit 102 includes two charging paths (the charging path 1021 and the charging path 1022), the control end of the single-pole double-throw switch is electrically connected to the charging path control end of the charging control unit 101. One end of the single-pole double-throw switch is electrically connected to the input end of the charging unit, and other two ends are electrically connected to the two charging paths, respectively. According to an instruction of the charging control unit 101, the single-pole double-throw switch connects the input end of the charging unit 102 electrically to the charging path 1021, or connects the input end of the charging unit 102 electrically to the charging path 1022.

Optionally, for the charging control unit 101 to control the charging unit 102 to disconnect or connect a charging path, in an implementation, each charging path has a corresponding control enabling end. The charging control unit 101 may control the control enabling end of each charging path in the charging unit 102 to control connection or disconnection of each charging path.

Further, when the power adapter 104 currently works in the first working mode, the largest temperature value is temperature, detected by the temperature collector 103, of the charging path corresponding to the first working mode. When currently working in the first working mode, the power adapter 104 transmits charging current by using the charging path corresponding to the first working mode. Therefore, the temperature of the charging path is the highest.

Figure 4:
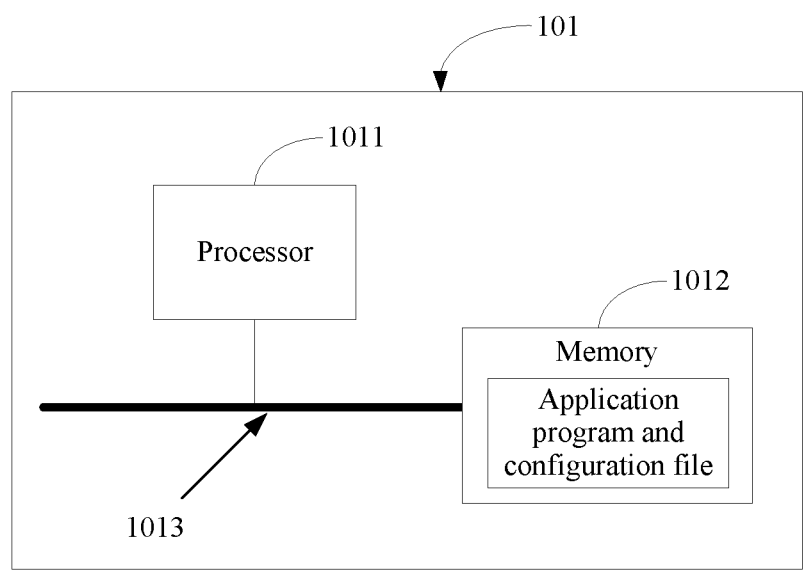
FIG. 4 is a schematic structural diagram of a charging control unit according to an embodiment of the present invention.

Specifically, as shown in FIG. 4, the charging control unit 101 may include a processor 1011, a memory 1012, and a communications bus 1013. The memory 1012 stores a program or an instruction. The processor 1011 invokes the program or the instruction stored in the memory 1012.

The memory 1012 is configured to store the program or the instruction. The processor 1011 executes the program or the instruction stored in the memory, to implement functions recorded in this embodiment of the present invention. The memory 1012 may be a volatile memory (English: volatile memory), such as a random access memory (random-access memory, RAM), a non-volatile memory (non-volatile memory), such as a read-only memory (read-only memory, ROM), a flash memory (flash memory), a hard disk (hard disk drive, HDD), or a solid state drive (solid-state drive, SSD), or a combination of the foregoing types of memories.

The processor 1011 is a control center of the charging control unit 101, and may be a central processing unit (central processing unit, CPU) or an external CPU, or may be an application-specific integrated circuit (Application Specific Integrated Circuit, ASIC) or be configured as one or more integrated circuits implementing the embodiments of the present invention, for example, one or more microprocessors (digital signal processor, DSP) or one or more field programmable gate arrays (Field Programmable Gate Array, FPGA). The processor 1011 may implement various functions of the charging control unit 101 by running or executing program code stored in the memory 1012 and by invoking data stored in the memory 1012.

The communications bus 1013 may be an industry standard architecture (Industry Standard Architecture, ISA) bus, a Peripheral Component Interconnect (Peripheral Component, PCI) bus, an extended industry standard architecture (Extended Industry Standard Architecture, EISA) bus, or the like. The bus 1013 may be classified into an address bus, a data bus, a control bus, and the like. For ease of denotation, the bus 1013 is represented by using only one bold line in FIG. 4. However, this does not indicate that there is only one bus or only one type of bus.

Optionally, the preset threshold may be a specified threshold. The threshold may be a preset upper collected-temperature limit for performing working state switching. Alternatively, the threshold may be current ambient temperature plus a temperature rise threshold. Certainly, the preset threshold may alternatively be another threshold. A setting principle and a specific value of the preset threshold are not limited in the present invention.

It should be noted that specific values of the preset threshold and the temperature rise threshold may be set according to an actual requirement. Values of the preset threshold and the temperature rise threshold are not specifically limited in this embodiment of the present invention.

Further, the current ambient temperature may be obtained by a temperature collector that is deployed in the battery charging apparatus 10 and that is configured to collect ambient temperature, or may be obtained by an external temperature collector that collects ambient temperature. A manner of obtaining the current ambient temperature is not specifically limited in this embodiment of the present invention.

Optionally, the second working mode of the power adapter 104 is any one of working modes supported by the power adapter 104 except the first working mode.

Further, preferably, a heating location of the charging path corresponding to the second working mode of the power adapter 104 is farthest from a heating location of the charging path corresponding to the first working mode of the power adapter 104. Alternatively, the charging path corresponding to the second working mode of the power adapter 104 is a charging path with a smallest theoretical quantity of heat generated in the charging unit 102, other than the charging path corresponding to the first working mode of the power adapter 104.

Specifically, the charging control unit 101 may prestore charging path heating information. The charging path heating information includes a heating location of each charging path and/or a theoretical quantity of heat generated in each charging path. When working in the first working mode, the power adapter transmits charging current by using the first charging path corresponding to the first working mode. When the largest temperature value transferred by the temperature collector 103 is greater than or equal to the preset threshold, the charging control unit 101 determines the second charging path by querying the prestored charging path heating information. The heating location of the second charging path is farthest from the heating location of the first charging path. Then, the charging control unit 101 instructs the power adapter 104 to switch to the second working mode corresponding to the second charging path.

Optionally, when working in the first working mode, the power adapter transmits charging current by using the first charging path corresponding to the first working mode. When the largest temperature value transferred by the temperature collector 103 is greater than or equal to the preset threshold, the charging control unit 101 determines the second charging path by querying the prestored charging path heating information. The second charging path is the charging path with the smallest theoretical quantity of heat generated, other than the first charging path. Then, the charging control unit 101 instructs the power adapter 104 to switch to the second working mode corresponding to the second charging path.

Further, when the charging unit 102 includes only two charging paths, the charging path corresponding to the second working mode is a charging path other than the charging path corresponding to the first working mode.

Further, optionally, when the battery charging apparatus 10 is electrically connected to the power adapter 104, the charging control unit 101 is further configured to: obtain a working mode supported by the power adapter 104; and if determining that the power adapter 104 supports at least two working modes and determining that charging paths corresponding to the at least two working modes supported by the power adapter 104 exist in the charging unit 102, perform the indicating a working state of the charging unit 102 and a working state of the power adapter 104 according to the temperature transferred by the temperature collector 103. Specifically, when the power adapter 104 works in the first working mode and the largest temperature value transferred by the temperature collector 103 is greater than or equal to the preset threshold, the charging control unit 101 instructs the power adapter 104 to switch to the second working mode, and instructs the charging unit 102 to disconnect the charging path corresponding to the first working mode and connect the charging path corresponding to the second working mode.

Further, the charging control unit 101 may be further configured to: in an initial charging state of the battery charging apparatus 10, instruct the power adapter 104 to work in a third working mode, and instruct the charging unit 102 to connect a charging path corresponding to the third working mode.

The third working mode is any one of working modes supported by the power adapter 104, and the charging path corresponding to the third working mode exists in the charging unit 102.

Specifically, when the battery charging apparatus 10 detects that an external power adapter 104 is connected, or when the battery charging apparatus 10 detects that AC power is input, the battery charging apparatus 10 instructs the power adapter to work in a working mode corresponding to the initial charging state, and instructs the charging unit to connect a charging path corresponding to the working mode.

The initial charging state may be randomly determined, may be a preset charging state, or may be a charging state during last charging.

For example, when the initial charging state is a preset first charging state, a working mode, of the power adapter, corresponding to the first charging state is a first working mode. In this case, when the battery charging apparatus detects that the external power adapter is connected, the battery charging apparatus instructs the power adapter to work in the first working mode, and instructs the charging unit 102 to connect a charging path corresponding to the first working mode. A specific initial charging state is not limited in this embodiment of the present invention, and may be determined according to an actual design requirement.

Figure 5:
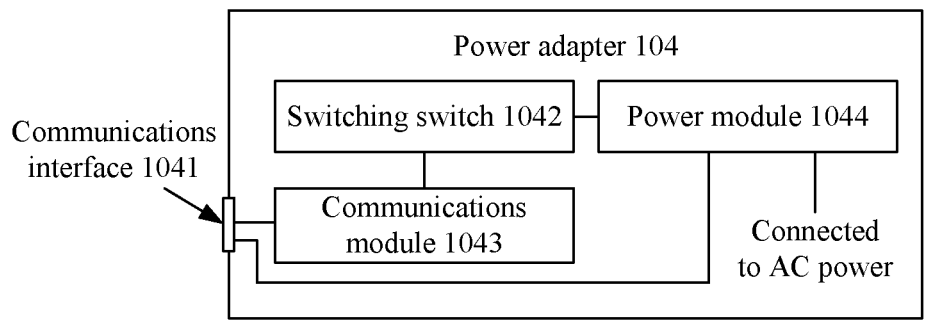
FIG. 5 is a schematic structural diagram of a power adapter according to an embodiment of the present invention.

Further, if charging power for the battery charging apparatus 10 is supplied by an external power adapter 104, as shown in FIG. 5, the power adapter 104 supports at least two working modes, and the power adapter 104 includes a communications interface 1041, a switching switch 1042, a communications module 1043, and a power module 1044. The communications module 1043 communicates with the battery charging apparatus 10 by using the communications interface 1041. The switching switch 1042 switches output power of the power module 1044 according to working mode switching instruction information that is received by the communications module 1043 and that is sent by the battery charging apparatus 10. The power module 1044 is connected to an AC power supply, and the power module 1044 supplies charging power for the battery charging apparatus 10 by using the communications interface 1041.

Specifically, the communications module 1043 communicates with the battery charging apparatus 10 by using the communications interface 1041. When the largest temperature value transferred by the temperature collector 103 to the charging control unit 101 is greater than or equal to the preset threshold, the battery charging apparatus 10 sends, to the communications module 1043 by using the communications interface 1041, information used to instruct the power adapter 104 to switch from the current first working mode to the second working mode. The communications module 1043 indicates a working state of the switching switch 1042 according to the information sent by the battery charging apparatus 10, to control a working mode of the power module 1044. The power module 1044 supplies charging power for the battery charging apparatus 10 by using the communications interface 1041.

It should be noted that both a controlled end and a charging power output end of the power adapter 104 may be included in the communications interface 1041 if charging power for the battery charging apparatus 10 is supplied by the external power adapter 104. Certainly, alternatively, ports may be deployed separately for the controlled end and the charging power output end of the power adapter 104.

Optionally, in different working scenarios of the battery charging apparatus 10, the power adapter 104 may be external to the battery charging apparatus 10, or may be included in the battery charging apparatus 10.

Figure 6:
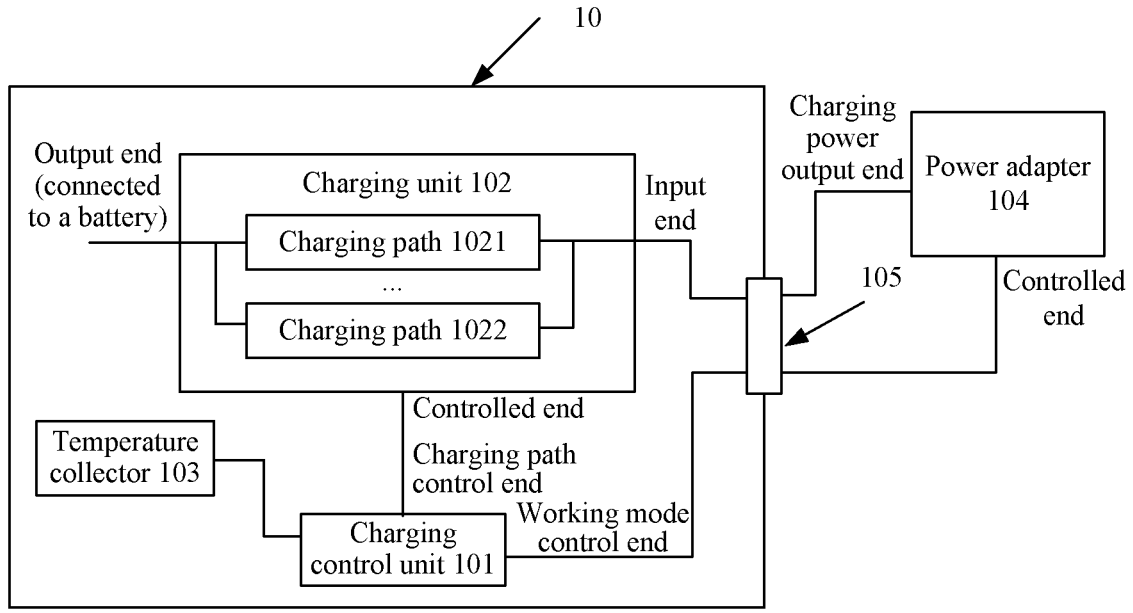
FIG. 6 is a schematic structural diagram of still another battery charging apparatus according to an embodiment of the present invention.

Further, as shown in FIG. 6, if charging power for the battery charging apparatus 10 is supplied by an external power adapter 104, the battery charging apparatus 10 may further include a communications port 105. The battery charging apparatus 10 is electrically connected to the power adapter 104 by using the communications port 105. The input end of the charging unit 102 is connected to the charging power output end of the power adapter 104 by using the communications port 105, or the working mode control end of the charging control unit 101 is connected to the controlled end of the power adapter 104 by using the communications port 105.

Figure 7:
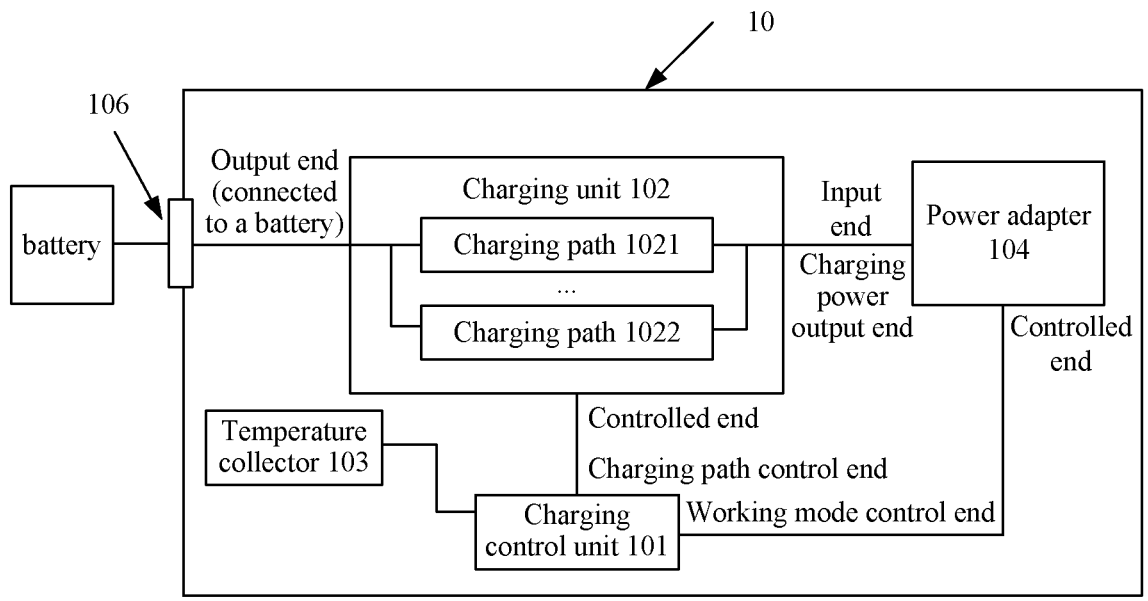
FIG. 7 is a schematic structural diagram of yet another battery charging apparatus according to an embodiment of the present invention.

Further, as shown in FIG. 7, if the battery charging apparatus 10 includes a power adapter 104, the battery charging apparatus 10 may further include a battery port 106, configured to connect the terminal battery.

In this way, when charging the terminal battery, the battery charging apparatus 10 provided in this embodiment of the present invention detects current temperature of the charging path in real time. When the detected largest temperature value is greater than or equal to the preset threshold, switching between the working modes of the power adapter is performed, and the charging path corresponding to the working mode of the power adapter is connected, to charge the terminal battery. Different charging paths have different heat accumulation locations. Therefore, in a charging process, switching to a different charging path according to detected temperature can disperse heat accumulation. This avoids continuous local heat accumulation at a fixed location. When heat dissipation is inadequate, heat is evenly distributed in a device, so as to prevent device performance from being affected by heat accumulation during charging, and increase a device life span. Therefore, use experience of a user is improved.

In addition, an embodiment of the present invention provides a battery charging method, applied to the foregoing battery charging apparatus 10.

Figure 8:
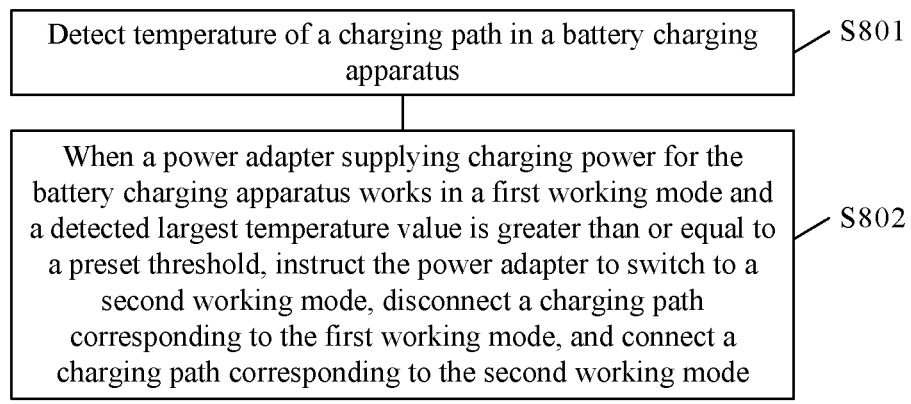
FIG. 8 is a schematic flowchart of a battery charging method according to an embodiment of the present invention.

Referring to FIG. 8, the method may include the following steps.

S801. Detect temperature of a charging path in the battery charging apparatus.

When step S801 is performed, one temperature collector may be deployed in the battery charging apparatus to detect temperature of charging paths, or at least two temperature collectors may be deployed to separately detect temperature of charging paths. Alternatively, temperature of a currently connected charging path may be detected. A process of performing step S801 is not specifically limited in this embodiment of the present invention.

Specifically, step S801 may be performed in real time, or may be performed periodically. When step S801 is performed is not specifically limited in the present invention.

Further, when step S801 is performed periodically, a periodic interval may be set according to an actual requirement. The periodic interval for periodically performing step S801 is also not specifically limited in this embodiment of the present invention.

S802. When a power adapter supplying charging power for the battery charging apparatus works in a first working mode and a detected largest temperature value is greater than or equal to a preset threshold, instruct the power adapter to switch to a second working mode, disconnect a charging path corresponding to the first working mode, and connect a charging path corresponding to the second working mode.

The second working mode is any one of working modes supported by the power adapter except the first working mode.

Preferably, a heating location of the charging path corresponding to the second working mode is farthest from a heating location of the charging path corresponding to the first working mode. Alternatively, the charging path corresponding to the second working mode is a charging path with a smallest theoretical quantity of heat generated in the battery charging apparatus, other than the charging path corresponding to the first working mode.

Further, when the power adapter supports only two working modes, the second working mode is a working mode other than the first working mode.

The largest temperature value is a value of highest temperature detected in a detection process.

Preferably, when the power adapter works in the first working mode to supply power for the battery charging apparatus, the collected current largest temperature value is temperature of the charging path corresponding to the current working mode (the first working mode) of the power adapter that supplies charging power for the battery charging apparatus.

It should be noted that the preset threshold has been described in detail, and details are not described herein again.

It should be noted that a manner of selecting the second working mode is described in detail in function descriptions of the battery charging apparatus 10, and details are not described herein again.

Figure 9:
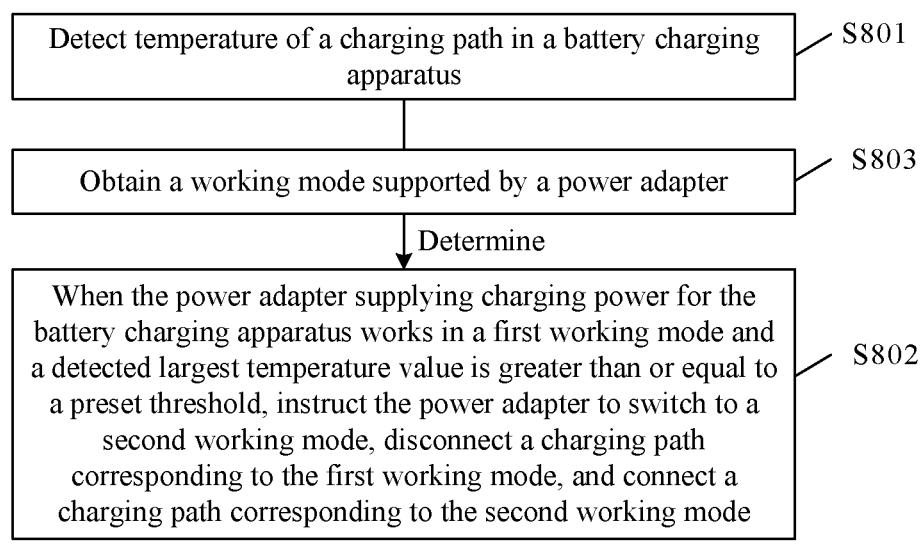
FIG. 9 is a schematic flowchart of a battery charging method according to an embodiment of the present invention.

Further, if charging power for the battery charging apparatus is supplied by an external power adapter, as shown in FIG. 9, before step S802 is performed, the method may further include the following step:

S803. Obtain a working mode supported by the power adapter.

The working mode supported by the power adapter may be obtained through communication with the power adapter.

Further, if it is determined that the power adapter supports at least two working modes and that charging paths corresponding to the at least two working modes supported by the power adapter exist in the battery charging apparatus, step S802 is performed.

Further, if it is determined that the power adapter supports only one working mode, the power adapter is instructed to work in the supported working mode. When the power adapter supports only one working mode and the detected largest temperature value is greater than or equal to the preset threshold, a user is alerted by using a display interface, and preferably, the charging path is disconnected or power output of a charger is turned off.

It should be noted that step S803 may be performed before step S801 or after step S801. A performing sequence of step S803 and step S801 is not limited in this embodiment of the present invention. FIG. 9 shows only one performing sequence. However, this does not limit the performing sequence.

Further, the method may further include:

in an initial charging state of the battery charging apparatus, instructing the power adapter to work in a third working mode, and connecting a charging path corresponding to the third working mode.

The third working mode is any one of working modes supported by the power adapter, and the charging path corresponding to the third working mode exists in the battery charging apparatus.

Specifically, when the battery charging apparatus 10 detects that the external power adapter 104 is connected, or when the battery charging apparatus 10 detects that AC power is input, the battery charging apparatus 10 instructs the power adapter to work in a working mode corresponding to the initial charging state, and instructs a charging unit to connect a charging path corresponding to the working mode.

The initial charging state may be randomly determined, may be a preset charging state, or may be a charging state during last charging.

For example, when the initial charging state is a preset first charging state, a working mode, of the power adapter, corresponding to the first charging state is a first working mode. In this case, when the battery charging apparatus detects that the external power adapter is connected, the battery charging apparatus instructs the power adapter to work in the first working mode, and instructs the charging unit 102 to connect a charging path corresponding to the first working mode. A specific initial charging state is not limited in this embodiment of the present invention, and may be determined according to an actual design requirement.

According to the battery charging method provided in this embodiment of the present invention, when a terminal battery is being charged, current temperature of the charging path is detected in real time. When the detected largest temperature value is greater than or equal to the preset threshold, switching between the working modes of the power adapter is performed, and the charging path corresponding to the working mode of the power adapter is connected. Different charging paths have different heat accumulation locations. Therefore, in a charging process, switching to a different charging path according to detected temperature can disperse heat accumulation. This avoids continuous local heat accumulation at a fixed location. When heat dissipation is inadequate, heat is evenly distributed in a device, so as to prevent device performance from being affected by heat accumulation during charging, and increase a device life span. Therefore, use experience of a user is improved.

In addition, an embodiment of the present invention provides another battery charging method, applied to the foregoing battery charging apparatus 10. Charging power for the battery charging apparatus 10 is supplied by an external power adapter.

Figure 10:
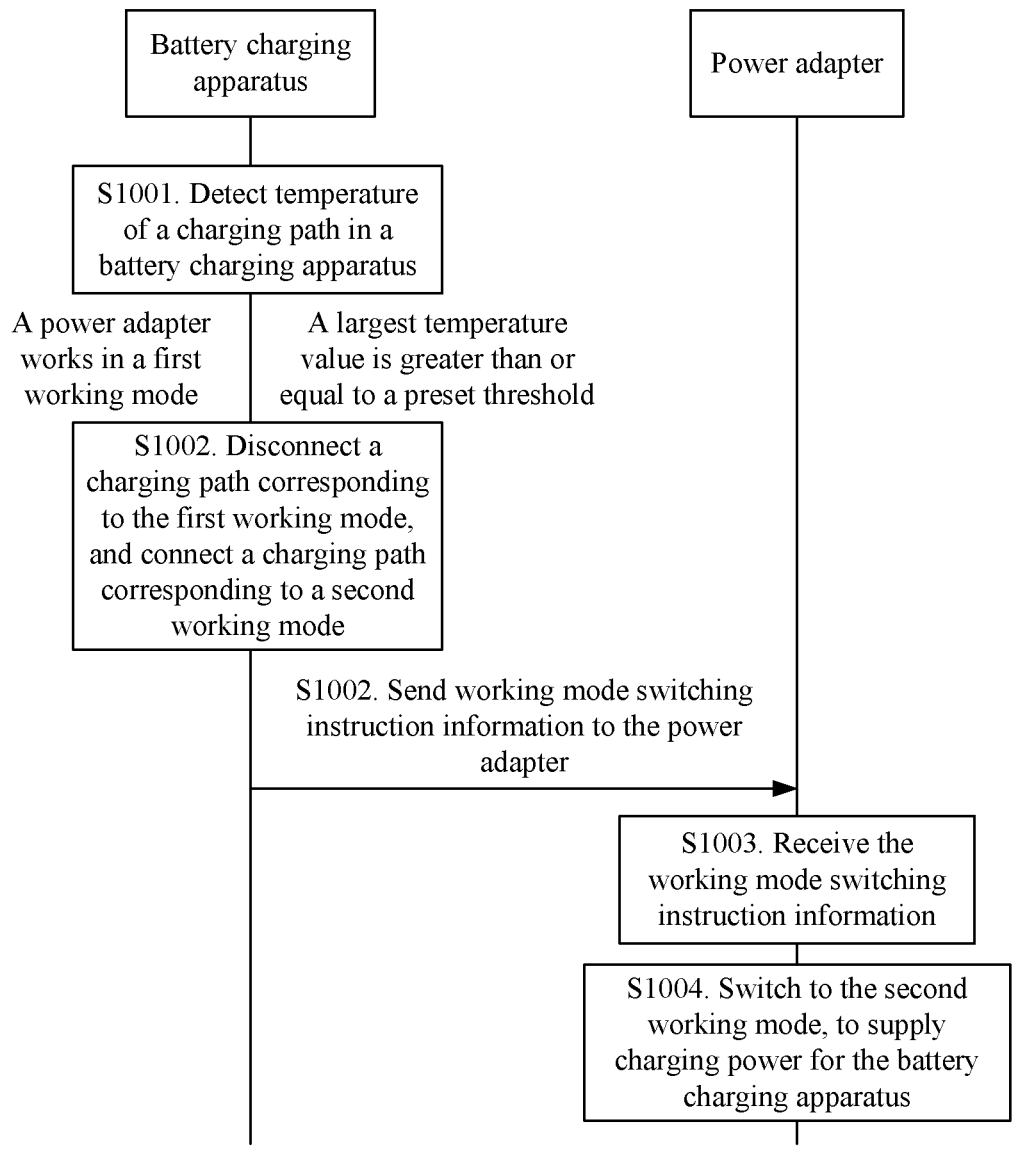
FIG. 10 is a schematic flowchart of another battery charging method according to an embodiment of the present invention.

Referring to FIG. 10, the method may include the following steps.

S1001. The battery charging apparatus detects temperature of a charging path in the battery charging apparatus.

It should be noted that step S1001 is the same as step S801, and details are not described herein again.

S1002. When the power adapter supplying charging power for the battery charging apparatus works in a first working mode and a largest temperature value detected by the battery charging apparatus is greater than or equal to a preset threshold, the battery charging apparatus disconnects a charging path corresponding to the first working mode, connects a charging path corresponding to a second working mode, and sends working mode switching instruction information to the power adapter.

The working mode switching instruction information instructs the power adapter to switch to the second working mode.

When the power adapter supplying charging power for the battery charging apparatus works in the first working mode and the largest temperature value detected by the battery charging apparatus is greater than or equal to the preset threshold, the battery charging apparatus may send the working mode switching instruction information to the power adapter at the same time when disconnecting the charging path corresponding to the first working mode and connecting the charging path corresponding to the second working mode. Alternatively, the battery charging apparatus may first disconnect the charging path corresponding to the first working mode and connect the charging path corresponding to the second working mode, and then send the working mode switching instruction information to the power adapter. Alternatively, the battery charging apparatus may first send the working mode switching instruction information to the power adapter, and then disconnect the charging path corresponding to the first working mode and connect the charging path corresponding to the second working mode. It should be noted that a performing sequence of the two actions (disconnecting the charging path corresponding to the first working mode and connecting the charging path corresponding to the second working mode, and sending the working mode switching instruction information to the power adapter) in step S1002 is not specifically limited in this embodiment of the present invention.

S1003. The power adapter receives the working mode switching instruction information.

S1004. The power adapter switches to the second working mode, to supply charging power for the battery charging apparatus.

Further, optionally, before step S1002 is performed, the method may further include: The battery charging apparatus obtains a working mode supported by the power adapter.

Further, if it is determined that the power adapter supports at least two working modes and that charging paths corresponding to the at least two working modes supported by the power adapter exist in the battery charging apparatus, step S1002 is performed.

Further, if it is determined that the power adapter supports only one working mode, the power adapter is instructed to work in the supported working mode. When the power adapter supports only one working mode and the detected largest temperature value is greater than or equal to the preset threshold, a user is alerted by using a display interface, and preferably, the charging path is disconnected or power output of a charger is turned off.

It should be noted that the obtaining, by the battery charging apparatus, a working mode supported by the power adapter may be performed before step S1001 or after step S1001. A sequence is not limited in this embodiment of the present invention.

Further, the method may further include: In an initial charging state of the battery charging apparatus, the battery charging apparatus instructs the power adapter to work in a third working mode, and connects a charging path corresponding to the third working mode.

It should be noted that a working manner in the initial charging state of the battery charging apparatus is described in detail in the method embodiments shown in FIG. 8 and FIG. 9, and details are not described herein again.

According to the battery charging method provided in this embodiment of the present invention, when a terminal battery is being charged, current temperature of the charging path is detected in real time. When the detected largest temperature value is greater than or equal to the preset threshold, switching between the working modes of the power adapter is performed, and the charging path corresponding to the working mode of the power adapter is connected, to charge the terminal battery. Different charging paths have different heat accumulation locations. Therefore, in a charging process, switching to a different charging path according to detected temperature can disperse heat accumulation. This avoids continuous local heat accumulation at a fixed location. When heat dissipation is inadequate, heat is evenly distributed in a device, so as to prevent device performance from being affected by heat accumulation during charging, and increase a device life span. Therefore, use experience of a user is improved.

Figure 11:
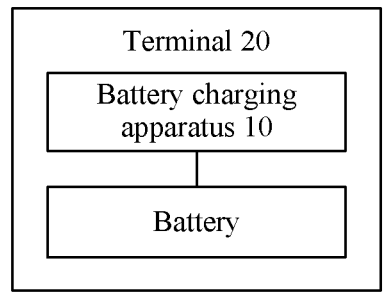
FIG. 11 is a schematic structural diagram of a terminal according to an embodiment of the present invention.

In addition, an embodiment of the present invention provides a terminal 20. As shown in FIG. 11, the terminal 20 includes:

the battery charging apparatus 10 and the battery that are described in any one of the foregoing embodiments.

Figure 12:
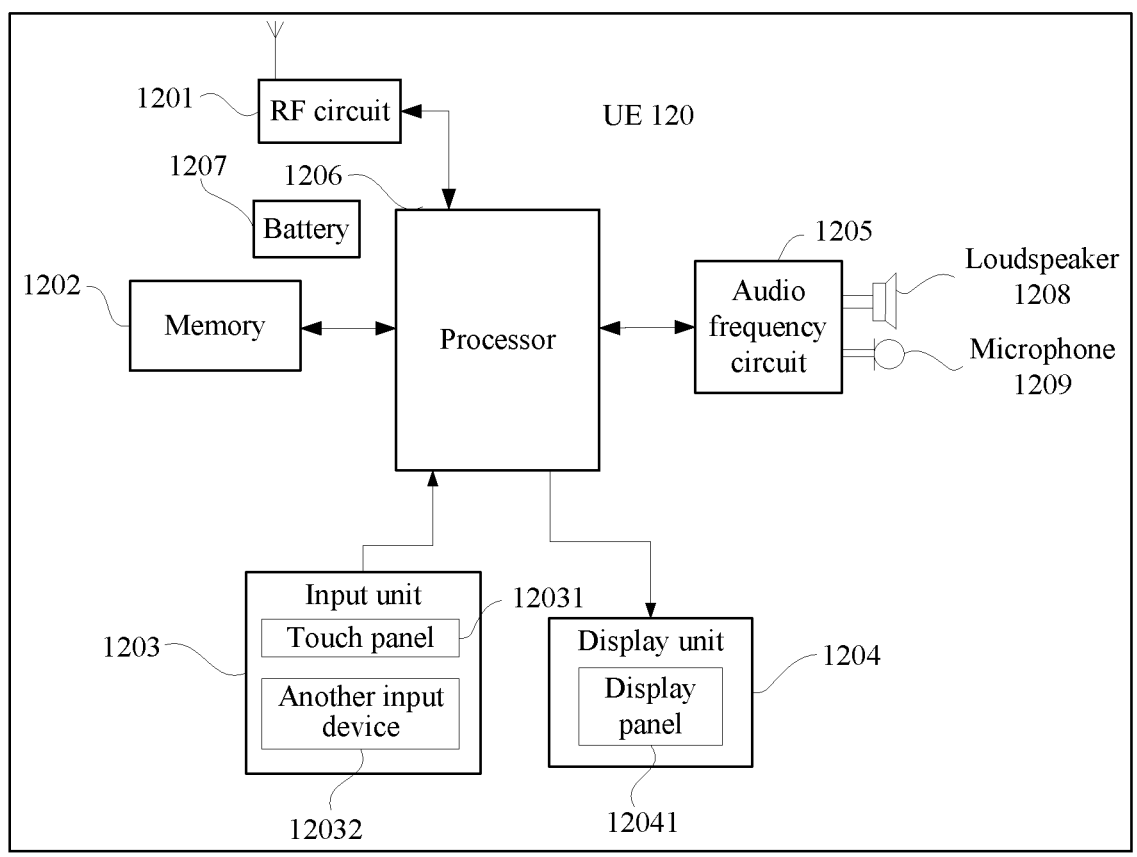
FIG. 12 is a schematic structural diagram of UE according to an embodiment of the present invention.

Specifically, as described in the apparatus embodiment of the present invention, the terminal 20 may be a terminal device such as UE or an MS. In this embodiment of the present invention, a case in which the terminal 20 is UE is used as an example to describe a structure and functions of the terminal 20. FIG. 12 is a block diagram of a partial structure of UE 120 related to the embodiments of the present invention.

As shown in FIG. 12, the UE 120 includes parts such as a radio frequency (radio frequency, RF) circuit 1201, a memory 1202, an input unit 1203, a display unit 1204, an audio frequency circuit 1205, a processor 1206, and a battery 1207. A person skilled in the art may understand that the structure of the UE 120 shown in FIG. 12 does not constitute any limitation on the UE, and the UE may include parts more or fewer than those shown in the figure, or a combination of some parts, or parts disposed differently.

The following specifically describes each constituent part of the UE 120 with reference to FIG. 11.

The RF circuit 1201 may be configured to receive and send signals during information reception and sending or during a call, and particularly, to receive downlink information from a base station and send the downlink information to the processor 1206 for processing. In addition, the RF circuit 1201 sends uplink data to the base station. Usually, the RF circuit 1201 includes but is not limited to an antenna, at least one amplifier, a transceiver, a coupler, a low noise amplifier (low noise amplifier, LNA), a duplexer, and the like. In addition, the RF circuit 1206 may further communicate with a network and another device through wireless communication. The wireless communication may be implemented by using any communications standard or protocol, including but not limited to Global System for Mobile Communications (global system of mobile communication, GSM), General Packet Radio Service (general packet radio service, GPRS), Code Division Multiple Access (code division multiple access, CDMA), Wideband Code Division Multiple Access (wideband code division multiple access, WCDMA), Long Term Evolution (long term evolution, LTE), email, short message service (short messaging service, SMS), and the like.

The memory 1202 may be configured to store a software program and a module. The processor 1206 executes various function applications and data processing of the UE 120 by running the software program and the module stored in the memory 1202. The memory 1202 may mainly include a program storage area and a data storage area. The program storage area may store an operating system, an application program required by at least one function (for example, a voice play function and an image play function), and the like. The data storage area may store data (for example, audio data, image data, and a phone book) and the like created according to usage of the UE 120. In addition, the memory 1202 may include a high-speed random access memory, and may further include a nonvolatile memory, for example, at least one magnetic disk storage device or a flash memory device, or a volatile solid-state storage device.

The input unit 1203 may be configured to: receive input numeral or character information, and generate key signal input that is related to user setting and function control of the UE 120. Specifically, the input unit 1203 may include a touchscreen 12031 and another input device 12032. The touchscreen 12031, also referred to as a touch control panel, can collect a touch operation performed by a user on or near the touchscreen 12031 (for example, an operation performed by the user on the touchscreen 12031 or near the touchscreen 12031 by using a finger, a stylus, or any other suitable object or accessory), and drive a corresponding connection device according to a preset program. Optionally, the touchscreen 12031 may include two parts: a touch detection apparatus and a touch controller. The touch detection apparatus detects a location touched by the user, detects a signal resulting from a touch operation, and transmits the signal to the touch controller. The touch controller receives touch information from the touch detection apparatus, converts the touch information into touch point coordinates, and sends the touch point coordinates to the processor 1206. In addition, the touch controller can receive and execute a command sent by the processor 1206. In addition, the touchscreen 12031 may be implemented in multiple types, such as a resistive type, a capacitive type, an infrared type, and a surface acoustic wave type. In addition to the touchscreen 12031, the input unit 1203 may further include the another input device 12032. Specifically, the another input device 12032 may include but is not limited to one or more of a physical keyboard, a function key (for example, a volume control key or a power on-off key), a trackball, a mouse, a joystick, or the like.

The display unit 1204 may be configured to display information input by the user or information provided for the user, and various menus of the UE 120. The display unit 1204 may include a display panel 12041. Optionally, the display panel 12041 may be configured in a form of a liquid crystal display (Liquid Crystal Display, LCD), an organic light-emitting diode (Organic Light-Emitting Diode, OLED), or the like. Further, the touchscreen 12031 may cover the display panel 12041. After detecting a touch operation on or near the touchscreen 12031, the touchscreen 12031 transmits information about the touch operation to the processor 1206 to determine a type of a touch event. Then, the processor 1206 provides corresponding visual output on the display panel 12041 according to the type of the touch event. In FIG. 12, the touchscreen 12031 and the display panel 12041 are used as two independent parts to implement input and output functions of the UE 120. However, in some embodiments, the touchscreen 12031 and the display panel 12041 may be integrated to implement the input and output functions of the UE 120.

The audio frequency circuit 1205, a loudspeaker 1207, and a microphone 1208 may provide an audio interface between the user and the UE 120. The audio frequency circuit 1205 may transmit, to the loudspeaker 1207, an electrical signal converted from received audio data. The loudspeaker 1207 converts the electrical signal into a sound signal and outputs the sound signal. In addition, the microphone 1208 converts a collected sound signal into an electrical signal, and the audio frequency circuit 1205 receives the electrical signal, converts the electrical signal into audio data, and outputs the audio data to the RF circuit 1204 to send the audio data to, for example, another mobile phone, or outputs the audio data to the memory 1202 for further processing.

The processor 1206 is a control center of the UE 120. The processor 1206 uses various interfaces and lines to connect all parts of the entire mobile phone, and executes various functions of the UE 120 and processes data by running or executing the software program and/or the module stored in the memory 1202 and by invoking data stored in the memory 1202, so as to perform overall monitoring on the UE. Optionally, the processor 1206 may include one or more processing units. Preferably, the processor 1206 may integrate an application processor and a modem processor. The application processor mainly processes an operating system, a user interface, an application program, and the like. The modem processor mainly processes wireless communication. It can be understood that, alternatively, the modem processor may not be integrated into the processor 1206.

The UE 120 further includes the battery 1207 that supplies electricity to all the parts. Preferably, the battery 1207 may be logically connected to the processor 1206 by using a power management system, so as to implement functions such as charge management, discharge management, and power consumption management by using the power management system. The UE 120 may further include a power management chip (Power Management Integrated Circuits), configured to manage charging, discharging, and power consumption of the UE 120, and transform, distribute, and detect electric energy.

A battery management system may include the battery charging apparatus 10, to charge the battery 1207 and control a working state of a charging path in the battery charging apparatus 10 and a working state of a power adapter according to temperature of the charging path in the battery charging apparatus 10.

It should be noted that a charging control unit in the battery charging apparatus may be a constituent part of the processor or the power management chip of the UE 120. That is, the processor or the power management chip performs a function of the charging control unit.

It should be noted that a specific structure, function, and working process of the battery charging apparatus 10 are described in detail in the apparatus and method embodiment part of the present invention, and details are not described herein again.

Although not shown, a Wireless Fidelity (wireless fidelity, Wi-Fi) module, a Bluetooth module, and the like may be further included in the UE 120. Details are not described herein.

The terminal 20 provided in the present invention includes the battery charging apparatus 10 to charge the battery, so as to achieve the same beneficial effects as the battery charging apparatus 10. Details are not described herein again.

In addition, an embodiment of the present invention provides a non-volatile computer readable storage medium that stores one or more programs. The one or more programs include an instruction, and when executed by a battery charging apparatus 10 including a charging control unit, a charging unit, and a temperature collector, the instruction causes the battery charging apparatus 10 to perform the following events:

detecting, by the temperature collector, temperature of a charging path in the charging unit, and transferring the detected temperature to the charging control unit; connecting, by the charging unit according to an instruction of the charging control unit, a charging path corresponding to a working mode of a power adapter; indicating, by the charging control unit, a working state of the charging unit and a working state of the power adapter according to the temperature transferred by the temperature collector; and when the power adapter works in a first working mode and a largest temperature value transferred by the temperature collector is greater than or equal to a preset threshold, instructing, by the charging control unit, the power adapter to switch to a second working mode, and instructing the charging unit to disconnect a charging path corresponding to the first working mode and connect a charging path corresponding to the second working mode.

It should be noted that various functions of the battery charging apparatus 10 are described in detail in the foregoing embodiments, and details are not described herein again.

According to the non-volatile computer readable storage medium provided in the present invention, when the battery charging apparatus 10 executes the program instruction stored in the readable storage medium, various functions of the battery charging apparatus 10 can be implemented, so as to achieve the same beneficial effects as the battery charging apparatus 10. Details are not described herein again.

All or a part of the steps in the foregoing method embodiments may be implemented by using a program instructing related hardware. The program may be stored in a non-volatile computer readable storage medium. When the program runs, steps in the foregoing method embodiments are performed. The foregoing storage medium includes various media that can store program code, such as a USB flash drive, a removable hard disk, a read-only memory (Read-Only Memory, ROM), a random access memory (Random Access Memory, RAM), a magnetic disk, and an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A battery charging apparatus, electrically coupled to a battery in a terminal, comprising:
a temperature collector configured to:
detect temperature of a charging path in a charging device comprising at least two charging paths coupled in parallel and configured to couple, according to an instruction of a charging control device, a charging path corresponding to a working mode of a power adapter; and
transfer the detected temperature to the charging control device electrically coupled to the temperature collector, the charging device, and the power adapter and configured to:
indicate a working state of the charging device and a working state of the power adapter according to the temperature from the temperature collector; and
instruct the power adapter to switch to a second working mode and the charging device to decouple a charging path corresponding to a first working mode and couple to a charging path corresponding to the second working mode when the power adapter works in the first working mode and a temperature value from the temperature collector is greater than or equal to a preset threshold.

2. The battery charging apparatus of claim 1, wherein the temperature collector is deployed for each charging path in the charging device to detect temperature of each charging path in the charging device.

3. The battery charging apparatus of claim 2, wherein the temperature value is temperature of the charging path corresponding to the first working mode.

4. The battery charging apparatus of claim 3, wherein a heating location of the charging path corresponding to the second working mode is farthest from a heating location of the charging path corresponding to the first working mode.

5. The battery charging apparatus of claim 1, wherein the battery charging apparatus is electrically coupled to the power adapter, and wherein the charging control device is further configured to:
obtain a working mode supported by the power adapter; and
indicate the working state of the charging device and the working state of the power adapter according to the temperature from the temperature collector when the power adapter supports at least two working modes and charging paths corresponding to the at least two working modes supported by the power adapter exist in the charging device.

6. The battery charging apparatus of claim 5, wherein the charging control device is further configured to instruct the power adapter to work in a third working mode and the charging device to couple a charging path corresponding to the third working mode in an initial charging state of the battery charging apparatus, wherein the third working mode is any one of working modes supported by the power adapter, and wherein the charging path corresponds to the third working mode existing in the charging device.

7. A terminal, comprising:
a battery; and
a battery charging apparatus coupled to the battery and comprising:
a temperature collector configured to:
detect temperature of a charging path in a charging device comprising at least two charging paths coupled in parallel and configured to couple, according to an instruction of a charging control device, a charging path corresponding to a working mode of a power adapter; and
transfer the detected temperature to the charging control device electrically coupled to the temperature collector, the charging device, and the power adapter and configured to:
- indicate a working state of the charging device and a working state of the power adapter according to the temperature from the temperature collector; and
- instruct the power adapter to switch to a second working mode and the charging device to decouple a charging path corresponding to a first working mode and couple a charging path corresponding to the second working mode when the power adapter works in the first working mode and a temperature value from the temperature collector is greater than or equal to a preset threshold.

8. The terminal of claim 7, wherein the temperature collector is deployed for each charging path in the charging device to detect temperature of each charging path in the charging device.

9. The terminal of claim 8, wherein the temperature value is temperature of the charging path corresponding to the first working mode.

10. The terminal of claim 9, wherein a heating location of the charging path corresponding to the second working mode is farthest from a heating location of the charging path corresponding to the first working mode.

11. The terminal of claim 10, wherein the battery charging apparatus is electrically coupled to the power adapter, and wherein the charging control device is further configured to:
- obtain a working mode supported by the power adapter; and
- indicate the working state of the charging device and the working state of the power adapter according to the temperature from the temperature collector when the power adapter supports at least two working modes and charging paths corresponding to the at least two working modes supported by the power adapter exist in the charging device.

12. The terminal of claim 11, wherein the charging control device is further configured to instruct the power adapter to work in a third working mode and the charging device to couple a charging path corresponding to the third working mode in an initial charging state of the battery charging apparatus, wherein the third working mode is any one of working modes supported by the power adapter, and wherein the charging path corresponds to the third working mode existing in the charging device.

13. The battery charging apparatus of claim 3, wherein the charging path corresponding to the second working mode is a charging path with a theoretical quantity of heat generated in the charging device other than the charging path corresponding to the first working mode.

14. The terminal of claim 9, wherein the charging path corresponding to the second working mode is a charging path with a theoretical quantity of heat generated in the charging device other than the charging path corresponding to the first working mode.

* * * * *